(12) United States Patent
Kolcz

(10) Patent No.: US 11,601,510 B1
(45) Date of Patent: *Mar. 7, 2023

(54) METHOD AND SYSTEM FOR TOPIC DISAMBIGUATION AND CLASSIFICATION

(71) Applicant: Twitter, Inc., San Francisco, CA (US)

(72) Inventor: Alek Kolcz, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/497,613

(22) Filed: Oct. 8, 2021

Related U.S. Application Data

(63) Continuation of application No. 16/909,544, filed on Jun. 23, 2020, now Pat. No. 11,310,338, which is a continuation of application No. 16/167,448, filed on Oct. 22, 2018, now Pat. No. 10,701,175, which is a continuation of application No. 14/836,407, filed on Aug. 26, 2015, now Pat. No. 10,108,674.

(60) Provisional application No. 62/041,827, filed on Aug. 26, 2014.

(51) Int. Cl.

| | | |
|---|---|---|
| *G06F 16/30* | (2019.01) | |
| *H04L 67/306* | (2022.01) | |
| *G06F 16/9535* | (2019.01) | |
| *G06Q 30/00* | (2023.01) | |
| *G06F 40/30* | (2020.01) | |
| *G06Q 50/00* | (2012.01) | |
| *H04L 51/52* | (2022.01) | |
| *H04L 67/53* | (2022.01) | |
| *H04W 4/21* | (2018.01) | |

(52) U.S. Cl.
CPC ........ *H04L 67/306* (2013.01); *G06F 16/9535* (2019.01); *G06F 40/30* (2020.01); *G06Q 30/00* (2013.01); *G06Q 50/01* (2013.01); *H04L 51/52* (2022.05); *H04L 67/53* (2022.05); *H04W 4/21* (2018.02)

(58) Field of Classification Search
CPC .................................................. G06F 16/9535
See application file for complete search history.

(56) References Cited

U.S. PATENT DOCUMENTS

| | | |
|---|---|---|
| 9,251,250 B2 | 2/2016 | Hershey et al. |
| 9,881,010 B1 | 1/2018 | Gubin et al. |
| 2012/0246725 A1* | 9/2012 | Osipkov ............... G06F 21/572 715/752 |

(Continued)

*Primary Examiner* — Baoquoc N To
(74) *Attorney, Agent, or Firm* — Fish & Richardson P.C.

(57) ABSTRACT

A method for generating recommendations involves selecting a first platform message, making a first determination that the first platform message is potentially associated with a plurality of topics including a first topic and a second topic, obtaining additional information associated with the first platform message including at least one of information about an account that authored the first platform message and information about third party accounts engaging with the first platform message, making a second determining that the first platform message is associated with the first topic using the plurality of topics and at least a portion of the additional information, wherein the first topic is an initial classification of the first platform message, generating a recommendation for at least one account based on the second determination, and providing the recommendation to at least one account.

24 Claims, 5 Drawing Sheets

(56) References Cited

U.S. PATENT DOCUMENTS

| | | |
|---|---|---|
| 2014/0379729 A1 | 12/2014 | Savage et al. |
| 2015/0058320 A1 | 2/2015 | Zheng et al. |
| 2015/0112918 A1 | 4/2015 | Zheng et al. |
| 2015/0286627 A1 | 10/2015 | Chang et al. |
| 2015/0332336 A1 | 11/2015 | Hong et al. |

* cited by examiner

METHOD AND SYSTEM FOR TOPIC DISAMBIGUATION AND CLASSIFICATION

CROSS-REFERENCE TO RELATED APPLICATIONS

This application is a continuation of U.S. application Ser. No. 16/909,544, filed on Jun. 23, 2020, which is a continuation of U.S. application Ser. No. 16/167,448, filed on Oct. 22, 2018, U.S. Pat. No. 10,701,175, issued Jun. 30, 2020, which is a continuation of U.S. application Ser. No. 14/836,407, filed on Aug. 26, 2015, U.S. Pat. No. 10,108,674, issued Oct. 23, 2018, which claims the benefit of U.S. Provisional Application No. 62/041,827 filed on Aug. 26, 2014, the contents of which are incorporated by reference herein.

BACKGROUND

Users of social networks typically author and distribute content via the social network. Traditional mechanisms for ascertaining the nature of the content are very limited. If the social network is unable to ascertain the nature of the content, then the social network's ability to provide additional relevant services based on the nature of the content is limited.

SUMMARY

In general, in one aspect, the invention relates to a method for generating recommendations, comprising selecting a first platform message, making a first determination that the first platform message is potentially associated with a plurality of topics comprising a first topic and a second topic, obtaining additional information associated with the first platform message, wherein the additional information comprises at least one selected from a group consisting of information about an account that authored the first platform message and information about third party accounts engaging with the first platform message, making a second determining that the first platform message is associated with the first topic using the plurality of topics and at least a portion of the additional information, wherein the first topic is an initial classification of the first platform message, generating a recommendation for at least one account based on the second determination, and providing the recommendation to at least one account.

In general, in one aspect, the invention relates to a method for searching platform messages comprising selecting a first platform message, making a first determination that the first platform message in associated with a first topic and a second topic, obtaining additional information associated with the platform message, wherein the additional information comprises at least one selected from a group consisting of information about an account that authored the first platform message and information about third party accounts engaging with the first platform message, making a second determining that the first platform message is associated with the first topic using the plurality of topics and at least a portion of the additional information, based on the second determination, associating the first platform message with a message search pool, after associating the first platform message with the message search pool, receiving a search query associated with the first topic, and providing, in response to the search query, the first platform message.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description In the following description of FIGS. 1-5, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a method and system for determining a topic associated with a given platform message. Once a topic has been associated with a platform message, one or more recommendations for (or based on) the platform message may be determined. Additionally, or alternatively, once a topic has been associated with the platform message, the platform message may be placed in message search pool and subsequently used to service search queries.

Figure 1:
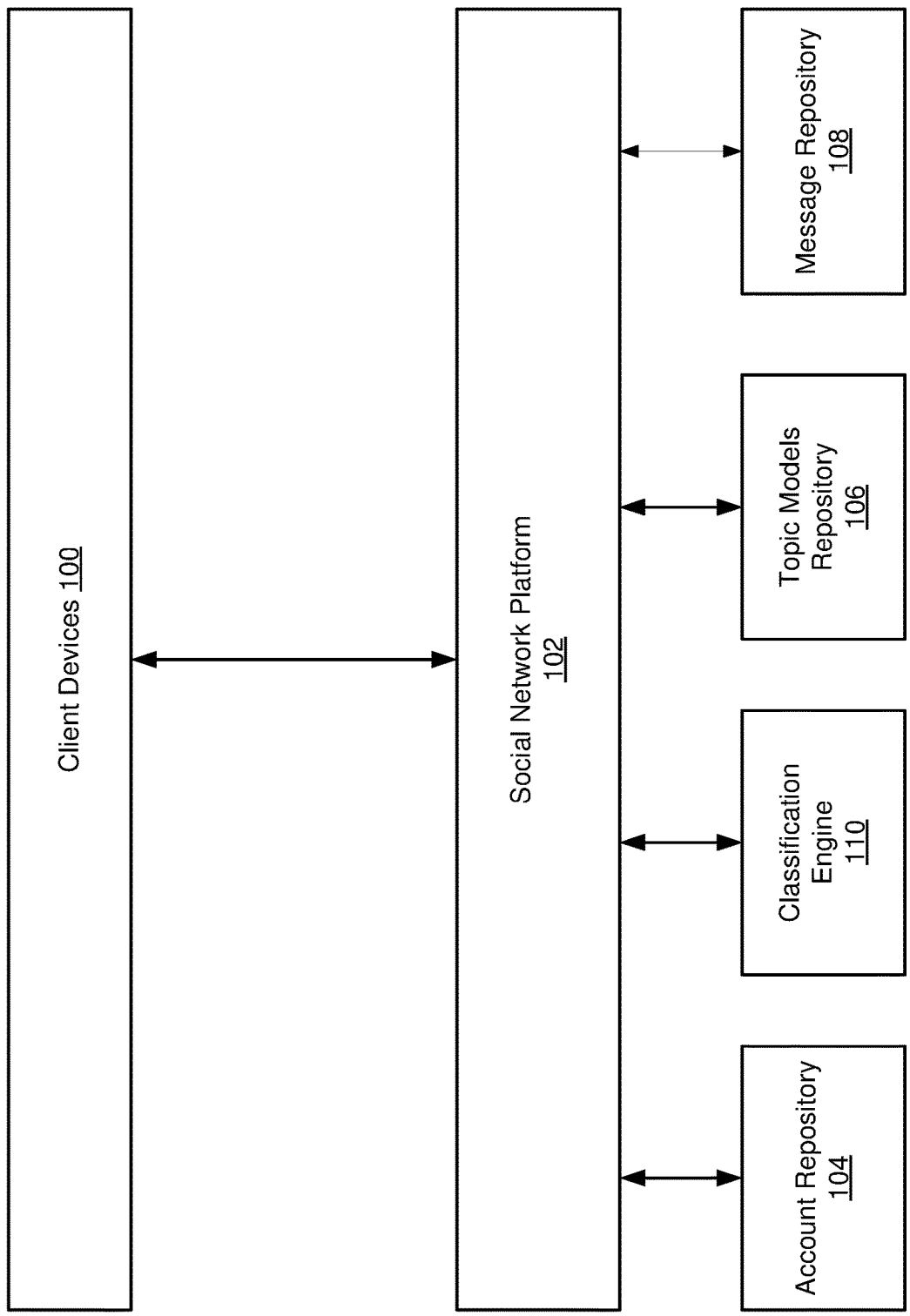
FIG. 1 shows a system in accordance with one or more embodiments of the invention.

FIG. 1 shows a system in accordance with one or more embodiments of the invention in accordance with one or more embodiments of the invention. The system includes one or more client devices (100) and a social network platform (102). Each of these components is described below.

As shown in FIG. 1, the social network platform (102) has multiple components including an account repository (104), a topic models repository (106), a message repository (108), and a classification engine (110), as well as other components that are not shown in FIG. 1. Various components of the social network platform (102) may be located on the same device (e.g., a server, mainframe, desktop Personal Computer (PC), laptop, Personal Digital Assistant (PDA), telephone, mobile phone, kiosk, cable box, and any other device) or may be located on separate devices connected by a network (e.g., a local area network (LAN), the Internet, etc.) using any combination of wired and wireless connections using any combination of communication protocols. Those skilled in the art will appreciate that there may be more than one of each separate component running on a device, as well as any combination of these components within a given embodiment of the invention.

A social network platform (102) connects users to other users of the social network platform (102), exchanges platform messages between connected users of the social network platform (102), services search queries from users, and/or provides an interface for a user (e.g., via client devices (100)) to create and view platform messages and other content (e.g., recommendations). In one or more embodiments of the invention, platform messages may be broadcast (or multicast) platform messages that are transmitted to at least a set of users. The users in the set may be self-selected (e.g., followers of the transmitting user) or users that satisfy a certain status with report to the transmitting user (e.g., belong to a group such as friends, family, etc.). The platform messages may include, but is not limited to, a comment from a user, a reference to a geographic location, personal status update, an official statement by a user representing an organization, a reference to another user of the social network, one or more terms descriptive of the message, an offer to buy or sell goods and/or services, other information not listed above or any combination thereof. Each platform messages may include, but is not limited to, text, universal resource locators (URLs), pictures, media files, multimedia files, other elements not listed above or any combination thereof. In one or more embodiments of the invention, the social network platform (102) may include restrictions on the size of the platform messages, such as a restriction on number of characters, size of included media, and other restrictions not listed above.

In one or more embodiments of the invention, the social network platform (102) is a platform for facilitating real-time communication between one or more entities. For example, the social network platform (102) may store millions of accounts of individuals, businesses, and/or other entities (e.g., pseudonym accounts, novelty accounts, etc.). One or more users of each account may use the social network platform (102) to send platform messages to other accounts inside and/or outside of the social network platform (102). The social network platform (102) may be configured to enable users to communicate in "real-time", i.e., to converse with other users with a minimal delay and to conduct a conversation with one or more other users during concurrent (which may include simultaneous) sessions. In other words, the social network platform (102) may allow a user to broadcast (or multicast) platform messages and may display the platform messages to one or more other users within a reasonable time frame so as to facilitate a "live" conversation (or interaction) between the users. Recipients of a platform message may have a predefined graph relationship with an account transmitting the platform message. In one or more embodiments of the invention, the user is not an account holder or is not logged in to an account of the social network platform (102). In this case, the social network platform (102) may be configured to allow the user to transmit platform messages and/or to utilize other functionality of the social network platform (102) by associating the user with a temporary account or identifier.

Figure 2:
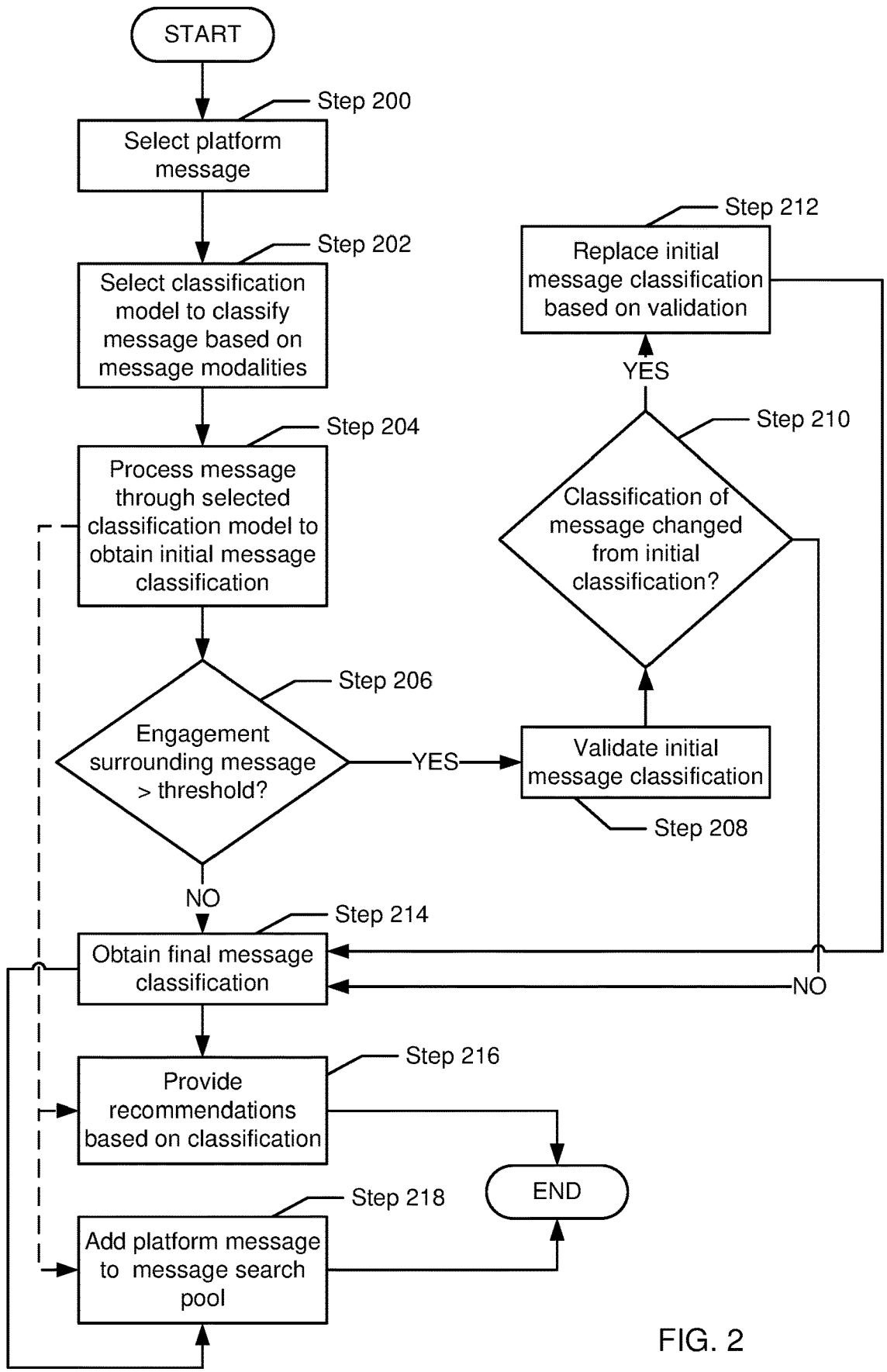
FIG. 2 shows a flow chart for multi-modal classification of a message in accordance with one or more embodiments of the invention.
Figure 3:
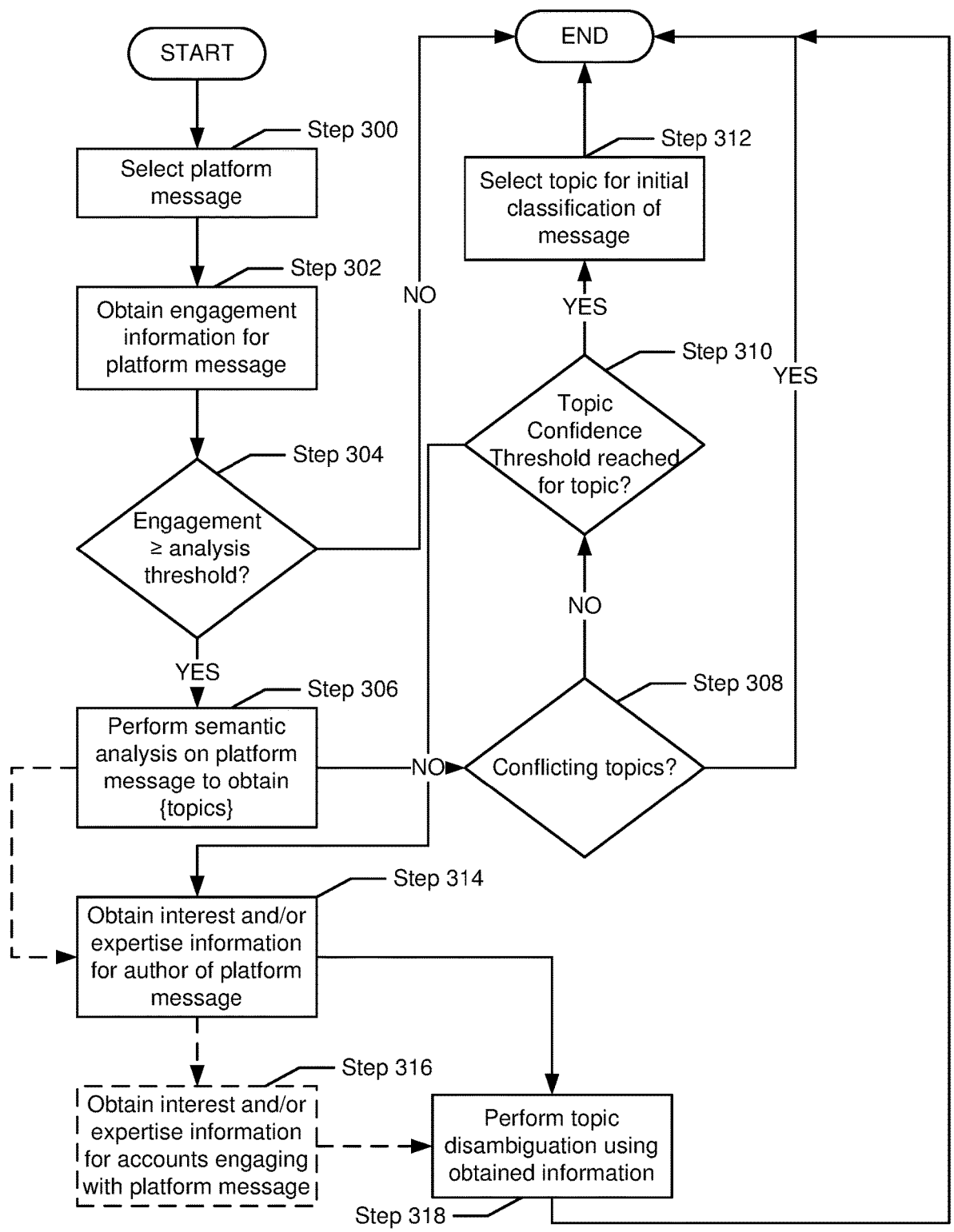
FIG. 3 shows a flowchart for classifying the text of a message to obtain a topic classification in accordance with one or more embodiments of the invention.
Figure 4:
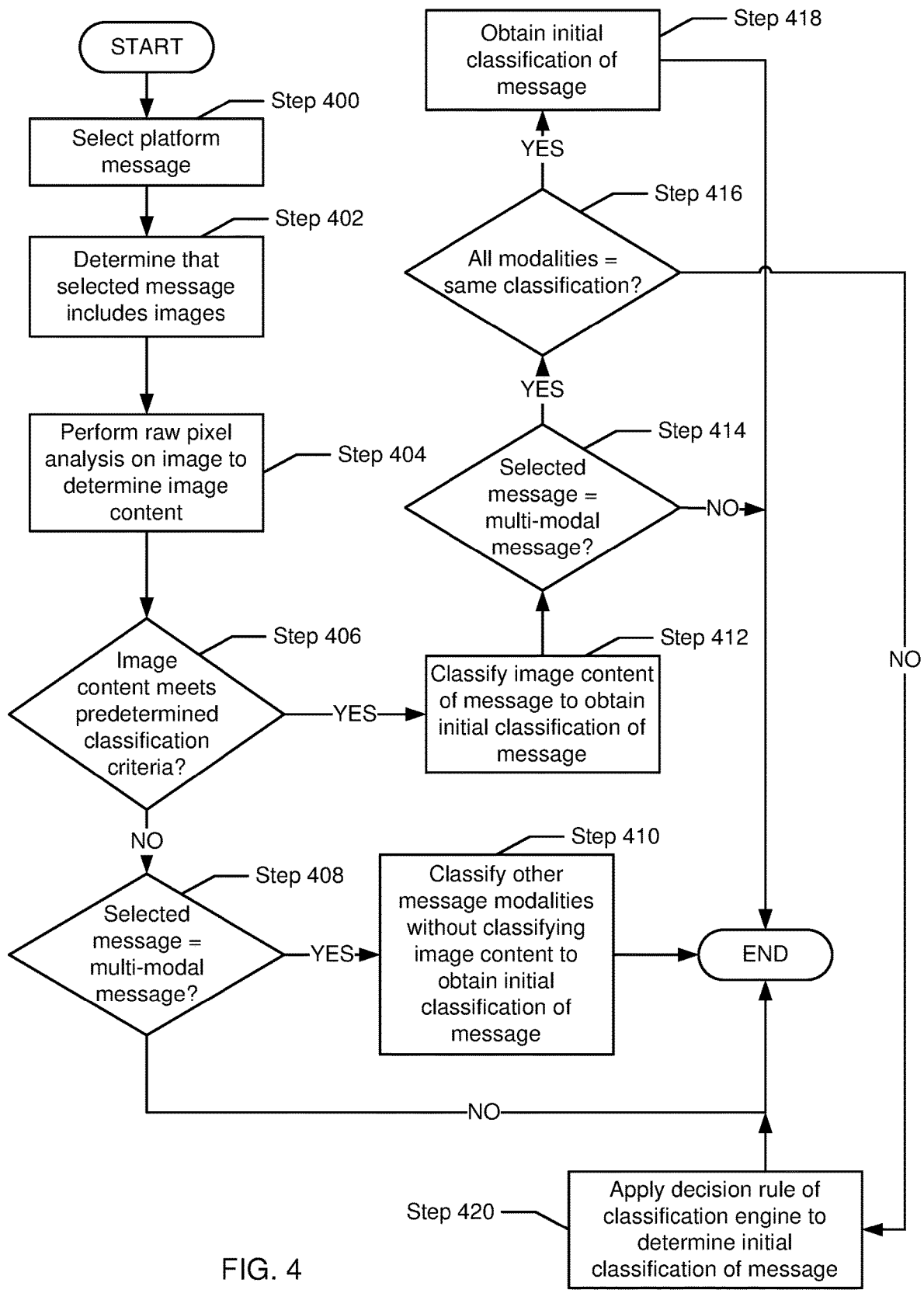
FIG. 4 shows a flow chart for classifying images of a message in accordance with one or more embodiments of the invention.

In one or more embodiments of the invention, the social network platform includes functionality to perform the methods shown in FIGS. 2-4.

In one or more embodiment of the invention, a client device (100) corresponds to any computing system (as described below in FIG. 3) that is configured to interface with the social network platform (102). For example, a client device may include a web browser application that enables the user of the client device to interface with the social network platform. In this example, the website that the user accesses, via the web browser application, may be a website for the social network platform (e.g., www.twitter.com) or may be a website that includes embedded content from the social network platform but is not a website for the social network platform (e.g., www.cnn.com may include embedded content from one or more social network platforms). In another example, the client device may have loaded thereon one or more applications provided by the social network platform that enables the user of the client device to interact with the social network platform, e.g., Twitter iOS application. In another example, the client device may have loaded thereon an application(s) that includes embedded content (e.g., platform messages, recommendations) created and/or distributed by the social network platform (or by 3rd parties), where such applications access the content from the social network platform via APIs (or other mechanisms) provided by the social network platform.

In one or more embodiments of the invention, the client devices are configured to interface with the social network platform using a frontend module (not shown) associated with the social network platform. In one embodiment of the invention, the frontend module is a software application or a set of related software applications configured to communicate with external entities (e.g., a client device (100)). The frontend module may include the application programming interface (API) and/or any number of other components used for communicating with entities outside of the social network platform (102). The API may include any number of specifications for making requests from and/or providing data to the social network platform (102).

In one or more embodiments of the invention, a user may use any client device (100) to receive the platform messages, recommendations (described below), receive responses to search queries, etc. For example, where the user uses a web-browser application executing on the client device to access the social network platform (102), an API of the frontend module may be utilized to define one or more streams and/or to serve the stream data to the client device for presentation to the user.

In one or more embodiments of the invention, the account repository (104) stores information about accounts in the social media platform. Specifically, the account repository (104) may store account data items that include information about a location of a user (or entity that controls the account), a self-description of the user (or entity that controls the account), zero, one or more interest topics associated with the account, zero, one or more expertise topics associated with the account. The information stored in an account repository may be provided by a user of the account, may be provided by an entity associated with the account (e.g., information provided by a company if the company controls the account), may be generated in accordance with FIG. 2, and/or may be generated in accordance with any other mechanism. The account repository may include additional or other information about the account without departing from the invention.

In one embodiment of the invention, an interest topic corresponds to a topic in which that one or more users of the account have expressed interest. The interest topic associated with an account may be based on direct input from the one or more users of the account, e.g., one or more users of the account expressly indicate that they are interested in a topic. The interest topic associated with an account may be based on indirect input from the one or more users of the account, e.g., the social network platform (or a 3rd party entity) may determine, based the user's engagement (described below), that one or more users of the account are likely interested in a particular topic.

In one embodiment of the invention, an expertise topic corresponds to a topic that others in the social network believe one or more users of an account is an expert. Said another way, unlike the interest topics for an account that are based on actions performed by the account, the expertise topics for an account are based on actions performed by other accounts.

Continuing with the discussion of FIG. 1, in one embodiment of the invention, the topic models repository (106) includes one or more topic models that are used to analyze the content of a platform message (see FIG. 2, below) and/or determine whether there is a conflict between two or more topics. In one embodiment of the invention, the topic models may include character strings, keywords, phrases, clauses, hashtags, etc. that mapped to one or more topics. For example, if "NBA" is included in any portion of the platform message then the topic model may indicate that there is a high likelihood that the platform message is associated with the topic "basketball". In another embodiment of the invention, the topic models may include mappings between a topic and one/or more conflicting topics. For example, the topic model may include the topic "heavy metal" mapped to the topic of "classical music", which indicates that there is a conflict between the topics of heavy metal and classical music. Said another way, there is a low likelihood that a single platform message could be associated with both of the aforementioned topics. The topic models may be manually generated by users (or administrators) of the social network platform, automatically generated by the social network platform, and/or obtained from 3rd parties that are not users or administrators of the social network platform.

In one or more embodiments of the invention, the social network platform may include a message repository (108), where the message repository includes functionality to store message data items that include platform messages and platform messages metadata. The platform messages metadata may include, but is not limited to, an identifier of the originating account of the platform message, a list of accounts who received the platform message, a number of accounts who received the platform message, statistics (e.g., a ratio of connected accounts to the originating account that forward the platform message versus disconnected users to the originating account that forward the platform message), time and date in which the platform message is transmitted, and other information. The message repository may include additional or other information about each platform message without departing from the invention. The message repository may also include the topic associated with the platform message if the platform message was analyzed using the method shown in FIG. 2. Those skilled in the art will appreciate that not all platform messages will be associated with a topic.

In one embodiment of the invention, the message repository (108) tracks which accounts interact with a given message and how the accounts interact with a given message. The following describes non-limiting engagement examples: A social network platform user "Mary" authors the message "I like Coffee Co.'s new flavors!" and submits it to the social network platform. Mark reads the message on the social network platform, and reposts the message using his own account in the form "Repost @Mary: 'I like Coffee Co.'s new flavors!'". Mark has engaged with Mary's message. Alison also sees Mary's message, and composes a message in response taking the form "I do too! @Mary: 'I like Coffee Co.'s new flavors!'". Alison has engaged with Mary's message. Finally, John views Mary's message and clicks an "Agree" button next the message as displayed on the social network platform website. John has engaged with the message. In one or more embodiments of the invention, the engagement by Mark and Alison, and John is tracked using the engagement data items, which are stored in the message repository (or in another repository that is within operatively connected to the social network).

In one or more embodiments of the invention, each engagement data item includes a message identifier (an identifier that uniquely identifies the platform message within the message repository), an engaging account identifier, an engagement type, an engagement source, an engagement timestamp, and an engagement location. Each of the aforementioned components is described below except for message identifier which has been previously described.

In one or more embodiments of the invention, the engaging account identifier identifies the account engaging with the message. In one or more embodiments of the invention, the engagement type identifies the type of engagement. The engagement type may be one of a set of identifiers that refer to a different kind of engagement. Engagement types may include, but are not limited to, "view" (or "view/expand"), "repost", "reply", and "agree". In one embodiments of the invention each engagement type is associated with an engagement weight, which may be used to convey the relative level of engagement between different types of engagement types. For example, a "click-through" engagement type (e.g., when a user of an account clicks on a link included within the platform message) may have a greater engagement weight than a "view/expand" engagement type (e.g., when an entity expands the visible portion of the platform message such that the user of the account can view the entire message content). The engagement weight may be stored within the engagement data item, for example, as part of the engagement type. Alternatively, the engagement weight for each engagement type may be maintained in a separate location in the social network platform.

In one or more embodiments of the invention, the engagement source identifies the client device type though which the account was engaging with the platform message. Specifically, the engagement source identifies the mechanism used by the engaging account to repost, distribute, respond, and otherwise engage with the platform message. The engagement source may identify, for example, a website that interacts with the frontend of the social network platform, an application on a mobile device, or a desktop application.

In one or more embodiments of the invention, the engagement timestamp is a record of the time the engagement occurred. In one or more embodiments of the invention, the engagement timestamp includes the time zone in which the time was recorded. In one or more embodiments of the invention, the engagement location is a record of the geographic location from which the account (via a client device) engaged with the platform message. The engagement location may be global positioning satellite coordinates of the client device submitted to the social network platform with the engagement (e.g., as recorded by the client device at the time of the engagement).

In one or more embodiments of the invention, an engagement type of "view" (or view/expand") indicates that the platform message was viewed. The platform message may be viewed on a client that is implementing a client version of the social network platform (e.g., a mobile Twitter application executing on a smart phone). In another embodiment of the invention, a "view" may also indicate that the platform message was viewed on a website in which it was embedded. For example, a widget may be embedded on a website where the widget shows platform messages. The widget may concurrently show multiple platform messages and the specific platform message(s) that the widget displays may change over time. When a platform message is presented via the widget and/or a user clicks on the platform message within the widget, an engagement data item is created, where the engagement data item indicates an engagement type of "view" and also includes the universal resource locator (URL) and/or any other data identifies the website on which the particular platform message was displayed.

In one or more embodiments of the invention, an engagement type of "repost" indicates that an account that received the platform message subsequently transmitted the message to other accounts in the social network platform. One example the platform message was viewed. One non-limiting example of a "repost" engagement type is a "retweet" of the platform message.

In one or more embodiments of the invention, an engagement type of "reply" indicates that an account that received an initial platform message subsequently generates a new platform message in order to reply (or respond) to the content of the initial platform message. The new platform message may be transmitted only to the author of the initial platform message and/or may be transmitted to other accounts in the social network platform. The new platform message may include a reference to the original platform message and/or a reference to the account (or author of the account) that authored the initial platform message.

In one or more embodiments of the invention, an engagement type of "agree" indicates that an account that received the platform message agrees with the content of the platform message. The indication that a given account agrees with the platform message may only be conveyed to the author of the platform message and/or may be conveyed to other accounts in the social network platform.

The invention is not limited to the engagement data item described above.

Continuing with the discussion of FIG. 1, the classification engine (110) stores one or more classification models for classifying (or categorizing) a message selected from the message repository (108). In one or more embodiments of the invention, the classification engine (110) may include an individual model for each modality (described below) of a message. Alternatively, the classification engine (110) may be a single, complex model configured to classify all the modalities of a message together and output a result. Message modality refers to format of the content of a message. For example, a text portion of a message is one modality and an image portion of a message is another modality. Other modalities may also exist for the content of a message. In one or more embodiments of the invention, the engagement data items described above that are associated with a message may also correspond to another modality that is distinct from the text and the image modalities of a message. Those skilled in the art will appreciate that the modalities of a message are not limited to the examples above.

Thus, a message associated with social network platform (102) may be multi-modal. Accordingly, classification models may take into account the types of modality of a message and the timing associated with the modality. For example, an early fusion classification model may combine the features (e.g., text, image, engagement data items, etc.) which correspond to the different modalities of a message into one feature vector in order to determine an overall classification for the entire message. In contrast, a late fusion classification model may build and tune a classification model for each modality associated with a message and combine the results of applying each individual model at a later point in time. Those skilled in the art will appreciate that each classification model type may have its own set of advantages and disadvantages. For example, in the late fusion models, there exists more freedom to create the training and data sets for building individual models for each message modality. Further, with late fusion models, properties of the social network platform such as time-delayed engagement data items and the like may be leveraged to obtain a more comprehensive classification. However, the output may be delayed. With early fusion classification models, there exists the possibility of a real-time (or near real-time) classification that may also be desired in some instances.

In one or more embodiments of the invention, the classification engine (110) includes decision logic for determining which classification prevails when a multi-modal message results in conflicting classifications for each modality (see e.g., FIG. 4). In one or more embodiments of the invention, the aforementioned late fusion classification models may use such decision logic for combining the individually tuned classification models for each message modality. Further, the classification engine (110) is configured to receive engagement data items and other data associated with a message for the message is making such determinations regarding conflicting classifications.

In one or more embodiments of the invention, one or more of the aforementioned repositories may be implemented as a storage service using service-oriented architecture (SOA) and configured to receive requests for data and to provide requested data to other components of the social network platform (102). In another example, one or more of the aforementioned repositories may include one or more tables in a distributed database management system (DBMS), a clustered database, a standalone flat file, and/or any storage software residing on one or more physical storage devices. Examples of a storage device may include, but are not limited to, a hard disk drive, a solid state drive, and/or other memory device. Any type of database or storage application may be used, in accordance with various embodiments of the invention.

The invention is not limited to the system shown in FIG. 1.

FIG. 2 shows a flowchart for classification of a message in accordance with one or more embodiments of the invention. While the various steps in these flowcharts are presented and described sequentially, one of ordinary skill will appreciate that some or all of the steps in the flow charts may be executed in different orders, may be combined or omitted, and some or all of the steps may be executed in parallel. Further, the methods described in the following flowchart may be performed for multiple platform message in parallel or concurrently (e.g., there is some overlap in the processing of two or more platform messages) by the social network platform.

In step 200, a platform message is selected. In step 202, a classification model stored in the classification engine is selected based on the modalities of the selected platform message. For example, if the message includes both text and image content, then a dual-modality classification model (or a multi-modal classification model) may be selected in step 202. Alternatively, multiple classification models may be selected for each modality of the message and then combined to obtain an overall classification.

In step 204, the message is processed through the selected classification model to obtain an initial message classification. In one or more embodiments of the invention, an initial classification may be a category or topic that is associated with the message or which describes the content of the message. The initial message classification may be of a single modality of the message, or may take into account all the different modalities of the selected message. In one or more embodiments of the invention, an initial classification may be "ignore" or "do not post" or an equivalent label that results in that particular modality being analyzed not being posted on the social network platform.

In step 206, a determination is made as to whether engagement data surrounding the selected platform message is greater than a threshold amount. That is, if the conversation around a particular platform message that has been initially classified by the classification engine is higher than a threshold amount, then the initial message classification is validated in step 208, to determine whether the initial message classification is indeed the correct classification for the message after observing the engagement around the message. In other words, the amount of engagement surrounding a message may change the initial classification of the message. In one or more embodiments, the threshold amount of engagement may be a predetermined number of reposts/replies/agrees of the message. However, if the engagement surrounding an initially classified message is not greater than a threshold amount (step 206), then the initial message classification is made the final message classification of the selected platform message in step 214. Those skilled in the art will appreciate that step 206 may occur after a certain time period has passed from the posting of the selected platform message in step 200. Because one of the inherent properties of the social network platform is that engagement data associated with a message may occur after some delay, e.g., 24-48 hours after the original posting of the message on the social network platform, steps 206-214 may not occur in real-time.

When the engagement data items associated with the selected platform message are greater than the threshold, the initial message classification is validated in step 208. For example, 24-48 hours after a message is posted on the social network platform, the message may become the center of social network conversation that may or may not be related to the topic(s) of the initial classification of the message. In this case, the initial classification would need to be validated, to ensure that the message is classified accurately after engagement associated with the message is received by the social network platform. As another example, validation of a message may involve determining the interested topics of accounts which reposted, replied to, or agreed with the message. In one or more embodiments of the invention, validation ensures that the message is classified using the right key words that describe the content of the message.

In one or more embodiments of the invention, validation of a message may involve selecting a classification model for the engagement data items associated with the message, re-processing the message through that classification model, and comparing the initial classification model results with the validation classification model results. Alternatively, in one or more embodiments of the invention, validation of a message may involve inputting the original classification model results into a complex classification model capable of multiple modality inputs, and obtaining a new classification result based on the multi-modal classification model. More specifically, validation of the classification of a message may involve obtaining the engagement data items associated with the message and determining the topic(s) and/or interest areas of the engagement data items.

Regardless of which classification model is chosen, a determination is made in step 210 as to whether the classification of the message has changed from the initial message classification. If the classification of the message resulting from validation is different than the initial message classification, then the initial message classification is replaced with the validated message classification in step 212. The post-validation message classification is then made the final message classification in step 214. Alternatively, if the classification that results from the validation process is the same as the initial message classification (i.e., if both classifications for the different message modalities agree), then no change is detected and the initial classification is made the final classification of the message in step 214.

In one or more embodiments of the invention, either the initial message classification obtained in step 204 or the final message classification obtained in step 214 may be used in real-time to perform certain classification related actions. For example, from either step 204 or 214, the process may optionally directly proceed to step 216, in which recommendations based on the initial message classification are provided to the social network user, or step 218, where the message is added to the message search pool. Referring to step 216, for example, as is described in further detail below in FIG. 3, if the initial message classification obtained in step 204 or the final message classification obtained in step 214 is based on the text of the message, the initial/final classification may be a selected topic (e.g., a category) which is associated with the message text content. This selected topic is then used to provide one or more recommendations. In one embodiment of the invention, providing a recommendation includes (i) identifying accounts that are associated with interest topics and/or expertise topics associated with the topic identified in step 212 or 218 and (ii) providing the platform message, e.g., displaying the platform message, to one or more users of the accounts identified in (i) via one or more client devices, where none of the accounts identified in (i) are currently following the account that authored the platform message. In this context, when a first account "follows" a second account, the first account may receive platform messages that are authored by the second account, these platform messages may be direct messages (i.e., platform messages only intended for the first account) or multicast messages (i.e., message intended for all accounts that are "following" the second account).

In another embodiment of the invention, providing a recommendation may include (i) identifying accounts that are associated with interest topics and/or expertise topics associated with the topic identified as the initial message classification in step 204 or the final message classification in step 214, and (ii) providing a notification to each of the accounts identified in (i) via one or more client devices, where none of the accounts identified in (i) are currently following the account that authored the platform message and the notification recommends that the identified accounts follow the account. For example, the notification (which may be in the form of a platform message) may indicate that that account that received the notification should follow the account that authored the platform message (i.e., the platform message selected in step 200).

In another embodiment of the invention, the recommendations may include advertisements (which may also be native advertisements) where the advertisements correspond to a product or service related to at least the topic identified in step 204 or 214. Once the appropriate advertisements are determined, they are displayed to the account that authored the platform message via one or more client devices. For example, if the selected topic for a platform message resulting from the processing of the message through the selected classification model is "American Football" and the account that authored the platform message does not include an interest of "American Football," then the account that authored the platform message may thereafter be associated with an interest of "American Football" and subsequently receive advertisements for products and/or services associated with American Football. The advertisements may be obtained from any known source include, but not limited to, an advertising exchange operatively connected to the social network platform.

Alternatively, upon obtaining the initial message classification in step 204 and/or the final message classification in step 214, which again may be in the form of a selected topic associated with the text of the message, the process may optionally directly proceed to step 218. In step 218, the platform message is added to the message search pool. In one embodiment of the invention, step 218 is performed after step 204 regardless of whether step 216 is performed. In other embodiments of the invention, step 218 is performed and step 216 is not performed. Finally, in other embodiments of the invention, step 216 is performed and step 218 is not performed.

In one embodiment of the invention, the message search pool only includes platform messages that have been associated with at least an initial message classification (e.g., a selected topic, an image classification, etc.). Accordingly, the message search pool may only include a small subset of the total platform messages associated with the social network platform. In one embodiment of the invention, only the platform messages in the message search pool may be used to service search requests (or queries). Accordingly, in one embodiment of the invention, if a platform message is not analyzed in accordance with FIG. 2 and/or is analyzed in accordance with FIG. 2 but is ultimately not associated with a topic then the platform message will not be present in any responses to search requests. Those skilled in the art will appreciate that while the below discussion of step 218 focuses on topic(s) classifications associated with a platform message in step 204, the initial message classification may be an image classification or another type of category associated with the message. Accordingly, in the below discussion, the terms "topic(s)" and "classification(s)" are interchangeable.

In one embodiment of the invention, when a search query (or search request) is received by the social network platform, the social network platform performs the following steps: (i) analyze search request to determine topic(s) associated with search request; (ii) query message search pool in order to identify platform message associated with topic(s) identified in (i); and (iii) return all of (or a subset of) (if present in the message search pool) platform message that are associated with the topic(s) identified in (i). The platform messages returned in (iii) may be display on the client device that issued the search request. The platform messages returned in (iii) may be displayed in any format and/or in any representation without departing from the invention.

In one embodiment of the invention, the search query may be used to identify the top trending topics in the social network. In such a scenario, the message search pool may be queried, for example, to determine the top five trending topics. The topic five tropics may be ascertained by determine the number of platform messages in the message search pool associated with each topic and then ranking the topics based on the number of associated platform messages to obtain a list of ranked topics. Finally, the top five ranked topics from the list of ranked topics may then be provided in response search query.

FIG. 3 shows a flowchart for topic disambiguation in accordance with one or more embodiments of the invention. Specifically, FIG. 3 shows an example of a process for classifying the text portion of a message. In other words, FIG. 3 shows the process for classifying one particular modality of a message: text. In one or more embodiments of the invention, when a message includes only text or is a multi-modal message that includes text, the message may be classified by associating the message with a topic, as described in FIG. 3 below. While the various steps in these flowcharts are presented and described sequentially, one of ordinary skill will appreciate that some or all of the steps in the flow charts may be executed in different orders, may be combined or omitted, and some or all of the steps may be executed in parallel. Further, the methods described in the following flowchart may be performed for multiple platform message in parallel or concurrently (e.g., there is some overlap in the processing of two or more platform messages) by the social network platform.

In step 300, a platform message is selected. In step 302, engagement information (if available) is obtained for the selected platform message. In one or more embodiments of the invention, the engagement data includes one or more engagement data items.

In step 304, a determination is made about whether the engagement level for the platform message within the social network is above an analysis threshold. This is similar to step 206 as discussed above. For example, if the platform message is associated with N engagement data items, where N is greater than or equal to a number corresponding to the analysis threshold, then the engagement level for the platform message may be greater than or equal to the analysis threshold. In another embodiment, the analysis threshold may be defined in relative terms (as opposed to in absolute terms). For example, the analysis threshold may specify that the top 1000 platform messages, ranked based on level of engagement, transmitted within the social network over a certain period of time (e.g., within the last hour) meet or exceed the analysis threshold. Other mechanisms for determining whether a given platform message should be analyzed using the method shown in FIG. 3 may be used without departing form the invention.

In one embodiment of the invention, all platform messages within the social network are analyzed and, as such, steps 302 and 304 are not performed. In other embodiments of the invention, the steps 302 and 304 are performed in order to identify a subset of platform messages that should be analyzed using the method shown in FIG. 3. In such scenarios, there are a significant number of platform messages being transmitted within the social network platform and, for example, due to resource constraints and/or latency constraints, only a subset of platform messages may be processed.

In one embodiment of the invention, if no engagement information is available for a given platform message then either (i) the processing of the platform message may cease following step 304 or (ii) the processing of the platform message may proceed from step 302 directly to step 306.

In one embodiment of the invention, step 304 is performed for all platform messages which include text, and only the messages that exceed an analysis threshold (as described above) are selected in step 300 for processing. In such cases, the method shown in FIG. 3 does not include steps 302 and 304.

Continuing with the discussion of FIG. 3, in step 306, the content of the platform message is obtained and processed using semantic analysis in order to determine a set of possible topics with which the platform message is associated. That is, because the modality of message being analyzed in FIG. 3 is text, semantic analysis may be chosen as the classification model for the message. The resulting set, denoted as {topics} may include zero, one or more topics. Further, each topic may be associated with a topic confidence rating, which indicates the probability (or likelihood) that a platform message is associated with a given topic. For example, if the message content is "Great tackle by Simon", then the potential topics may be (i) Football—60% and (ii) Rugby—30%. Accordingly, in this example, there is 60% chance that the platform message is about football and the 30% chance that the message is about rugby.

The semantic analysis may use one or more topic models from the topic model repository. The topic models may include keywords, phase, etc. and corresponding topics with which they may be associated. The topic models may also be used to ascertain the topic confidence rating associated with each topic. Any type of semantic analysis may be used without departing from the invention.

In one embodiment of the invention, if no possible topics are obtained in step 306 then the process may end or may proceed directly to step 314. In one embodiment of the invention, if there low level of engagement for the platform message then the process may end. Alternatively, if there is a high level of engagement, then the process may proceed even though the no topics were identified in Step 306.

In step 308, if two or more topics were identified in step 306, then a determination is made about whether the topics conflict. In one or more embodiments of the invention, topics may be considered to be conflicting if the topics are considered to be mutually exclusive and/or if there is a low likelihood than a single platform message may be possibly associated with the two or more topics. Step 308 may be performed using information obtained from one or more topic repository models. For example, if the topics resulting from step 306 are "heavy metal" and "classical music" and one or more topic models in the topic models repository indicates that these two topics are conflict, then a topic conflict is detected. If a conflict is detected, then the process ends; otherwise, the process proceeds to step 310. If there is only one topic obtained from step 306, then the process may proceed to step 314 and step 308 may not be performed.

In step 310, a determination is made about whether any of the topics identified in step 306 are associated with a topic confidence rating that is greater than or equal to the topic confidence threshold. The topic confidence threshold corresponds to a threshold at (or above which) the platform message is deemed to be associated with a given topic. For example, if the potential topics for are given platform message are (i) Football—60% and (ii) Rugby— 30% and the topic confidence threshold is 75%. Then none of the topics satisfy the topic confidence threshold and, accordingly, the process proceeds to step 314. Alternatively, if the topic confidence threshold is 58%, then the platform message would be deemed to be associated with the topic of "football" and the process would proceed to step 312.

In step 312, the topic that is associated with a topic confidence rating that is greater than or equal to the topic confidence threshold is selected as the topic that is associated with the platform message. This topic may become the initial classification of the message. The process then ends.

In step 314, the interest topics and/or expertise topics (if available) for the account that authored the platform message are obtained. For example, the account repository may be queried to determine whether the account that authored the platform message is associated with any interest topics and/or expertise topics. For each interest topic and/or expertise topic, the account repository may include an interest level and/or an expertise level. The interest level indicates (e.g., on a relative basis) how interested the account that authored the platform message is about a given topic. For example, the interest topics may be fashion—10%; gardening—80%, which indicates that the account is much more interested in gardening than in fashion. The expertise level indicates (e.g., on a relative basis) how much of an expert others consider the account that authored the platform message to be about a given topic. For example, the expertise topics may be Football—60%; rugby—30%, which indicates that the account is considered to be more of an authority on football than on rugby. The process may proceed directly from step 314 to step 318; alternatively, the process may proceed from step 314 to step 316.

In step 316, the interest topics and/or expertise topics (if available) for accounts that engaged with the platform message are obtained. For example, using the engagement data items associated with a given platform message, one or more accounts that engaged with the platform message may be identified. The identity of the accounts may then be used to lookup account information in the account repository, where the account information may include zero, one or more interest topics per account and zero, one or more expertise topics per account.

In step 318, the information about potential topics obtained in step 306 along with additional information (e.g., information obtained in steps 314 and/or 316) is used to perform topic disambiguation in order to determine the topic that is associated with the platform message. The topic disambiguation may use the aforementioned information to determine the likelihood that a given topic is associated with the platform message. The topic with the highest likelihood of being associated with the platform message may be used to select the topic associated with the platform message. This topic becomes the initial classification of the message in step 312.

In one embodiment of the invention, the information obtained in step 316 is used to determine the distribution of interest topics and/or expertise topics of accounts that are engaging with the message. Further, those skilled in the art will appreciate that the end of the process of FIG. 3 results in an initial classification, which may still be validated. That is, FIG. 3 ends at step 204 in FIG. 2, and the process continues from there to validate and determine a final classification for the text content of the selected message. In one or more embodiments of the invention, after topic disambiguation, the process may proceed to classify other modalities of the same selected message (e.g., to classify image content of the message as described below in FIG. 4), to validate the initial message classification obtained in FIG. 3, or a combination of both. Further, in accordance with FIG. 2, in one or more embodiments of the invention, the initial classification obtained at the conclusion of FIG. 3 may directly be used to provide recommendations and/or may be used to save the initially classified message in the message search pool.

The following non-limiting examples illustrate various embodiments of topic disambiguation performed in step 318 to obtain an initial classification for a message containing text.

Example 1

Consider a scenario in which the following platform message is selected in step 200: "That was a great tackle by Smith". When the platform message is analyzed in accordance with step 306, the following potential topics are identified: American football—topic confidence rating of 60%; soccer—topic confidence rating of 40%; rugby—topic confidence rating of 40%. Further, in accordance with the performance of step 314, it is determined the account that authored the platform message has the following topics of expertise: American Football—expertise level: 60%; soccer—expertise level—0%; rugby—expertise level of 10%. The aforementioned information is taken into account in Step 218 in order to determine the following: 36% (60%*60%) likelihood of the topic being American Football, 0% likelihood of the topic being soccer; and 4% (40%*10%) likelihood of the topic being rugby. In view of the above results, a topic of American Football is associated with the platform message. This information may be stored with the platform message in the message repository (see FIG. 1).

Example 2

Consider a scenario in which the following platform message is selected in step 300: "That was a great tackle by Smith". When the platform message is analyzed in accordance with step 306, the following potential topics are identified: American football—topic confidence rating of 60%; soccer—topic confidence rating of 40%; rugby—topic confidence rating of 40%. Further, in accordance with the performance of step 316, it is determined the account that authored the platform message has no known expertise topics. However, in accordance with step 316 it is determined that the accounts that engaged with the platform message have the following interest distribution: American Football—30% of engaging accounts; soccer 50% of engaging accounts, 20% of the account has interests other than American Football and soccer. The aforementioned information is taken into account in Step 318 in order to determine the following: 18% (60%*30%) likelihood of the topic being American Football, 20% (40%*50%) likelihood of the topic being soccer; and 0% likelihood of the topic being rugby. In view of the above results, a topic of soccer is associated with the platform message. This information may be stored with the platform message in the message repository (see FIG. 1).

Example 3

Consider a scenario in which the following platform message is selected in step 300: "That was a great tackle by Smith". When the platform message is analyzed in accordance with step 206, the following potential topics are identified: American football—topic confidence rating of 60%; soccer—topic confidence rating of 40%; rugby—topic confidence rating of 40%. Further, in accordance with the performance of step 314, it is determined the account that authored the platform message has the following topics of expertise: American Football—expertise level: 60%; soccer—expertise level—30%; rugby—expertise level of 10%.

Finally, in accordance with step 216 it is determined that the accounts that engaged with the platform message have the following interest distribution: American Football— 30% of engaging accounts; soccer—50% of engaging accounts, rugby 20% of engaging accounts. The aforementioned information is taken into account in step 318 in order to determine the following: 11% (60%*60%*30%) likelihood of the topic being American Football, 6% (40%*30%*50%) likelihood of the topic being soccer; and 1% (40%*10%*20%) likelihood of the topic being rugby. In view of the above results, a topic of American Football is associated with the platform message. This information may be stored with the platform message in the message repository (see FIG. 1).

Those skilled in the art will appreciate that (i) other mathematical functions may be used to combine the information obtained in steps 306, 314 and 316 without departing from the invention and (ii) that step 318 may take into account other information (i.e., information other than information that is obtained in steps 306, 314, and 316) without departing from the invention.

FIG. 4 shows a flowchart for classifying a platform message which includes image data in accordance with one or more embodiments of the invention. Specifically, FIG. 4 shows the process by which a message having only image data or image data in combination with other modalities, for example, text data or engagement data items, is classified. While the various steps in these flowcharts are presented and described sequentially, one of ordinary skill will appreciate that some or all of the steps in the flow charts may be executed in different orders, may be combined or omitted, and some or all of the steps may be executed in parallel. Further, the methods described in the following flowchart may be performed for multiple platform message in parallel or concurrently (e.g., there is some overlap in the processing of two or more platform messages) by the social network platform.

Initially, in step 400, a platform message is selected. While FIG. 4 describes a standalone method for classifying image content of any platform message, in one or more embodiments of the invention, the platform message selected in step 400 may be the same message selected in step 300 of FIG. 3, when that message has both text and image content, for example. In step 402, the message is determined to include an image. The message may include only an image, or may be a multi-modal message having an image content and other types of modalities.

In step 404, raw pixel analysis of the image is performed to determine the image content. Those skilled in the art will appreciate that the raw pixel analysis may be done using any suitable method well-known in the art. At this stage, a determination is made as to whether the image content meets a predetermined classification criteria (step 406). Specifically, the social network platform may store predetermined criteria that establishes whether an image is not suitable for posting on the social network platform. For example, if the image contains weapons, this may indicate a violent image that is not suitable for public access. As another example, if the image is found to include too much bare human skin, this may be considered inappropriate content. Thus, in step 406, a filter is applied to ensure that the content of the analyzed image passes the predetermined criteria for public access to the image.

In one or more embodiments of the invention, when the image does not meet the predetermined classification criteria, a second determination is made as to whether the image is multi-modal in step 408. If the image is multi-modal, the other modalities of the message (e.g., text, engagement data items, etc.) may be used to classify the message and obtain an initial classification of the message in step 410. In this case, the image content may not be classified at all. Alternatively, classification of the image may occur when engagement data surrounding the image is generated after some period of time, and the image content is validated to determine whether the initial 'no classification' decision was properly determined.

Those skilled in the art will appreciate that when the other modalities of the message are used to classify the message, and when an initial message classification is obtained using only the other modalities, any recommendations provided based on the initial message classification would be based only on the modality(ies) used to actually classify the message. Thus, for example, if the image content of a message is ignored by a classification model, then the recommendations or advertisements provided by the social network platform based on classification of the message may be restricted to the text or engagement data of the message. Similarly, in one or more embodiments of the invention, only the classified portion of the message may be added to the message search pool, whereas the unclassified image content, for example, of the message is not included as part of the message that is searchable. In addition, when the process of FIG. 2 is complete, and a final message classification is obtained, this may result in a different portion or the message in its entirety to be used for providing recommendations and for storing in the message search pool.

In step 406, when the image meets the predetermined classification criteria, the image content of the message is classified in step 412. Classification of the image may be performed as described in any of the embodiments above with respect to steps 202-204 of FIG. 2. In step 414, upon classification of the image content of the message, a determination is made as to whether the message is multi-modal. If the message is multi-modal, this indicates that further classification of the message is required. Accordingly, the other modalities of the message are classified. The classification of the other modes may take the form of FIG. 3, for example, if the message also contains text. During or upon obtaining an initial classification of the other modalities, in step 416, a determination is made as to whether the same classification is obtained for all of the different modalities of the message. If the classification of all of the message modalities agree (i.e., the classifications are not determined to conflict with each other), then a combined initial classification of the message is obtained in step 418 and the process ends.

In one or more embodiments, if the classifications of the message modalities do not agree in step 416 (i.e., there is a conflict), a decision rule may be applied to determine the initial classification of the message in step 420. The decision rule in step 420 may take into account the confidence ratings of the classifications, the interest and/or expertise information of the author of the message being analyzed, engagement data associated with the message, or any other suitable information. In one or more embodiments of the invention, the decision rules may be stored in the classification engine described in FIG. 1. Alternate locations for storing decision logic may also exist. Further, application of the decision rule may be implemented as described in steps 308-312 and/or 314-318 of FIG. 3.

The following non-limiting examples illustrate various embodiments for performing image classification in accordance with the process described in FIG. 4.

Example 4

Consider a scenario in which a platform message selected in step 400 includes only an image of a lingerie model on a runway. In this case, when the image is analyzed in step 404, the image content in step 406 may not meet the predetermined criteria for classification. That is, because the raw pixel data of the image results in a determination that the bare skin content of the image is high, the image may be determined by the platform as offensive, inappropriate, or not safe for viewing in any setting (e.g., not safe for work, etc.). Accordingly, the process would end after determining that the message is not multi-modal in step 408. In this case, the initial classification of the message may be that that the message content is "Do Not Post", that the image content is ignored, or some suitable label that indicates that the message is not suitable for posting on the social network platform.

Now suppose that 24-48 hours later, the image is re-posted on the social networking platform with text about a fashion show, and many people from the fashion community have agreed with or re-posted the image. In this case, when the engagement data surrounding the message is analyzed in step 206, the engagement data is greater than the threshold and the message classification proceeds to validation of the initial classification. Upon semantically analyzing the text accompanying the image, obtaining interest and expertise information of the author of the platform message, and analyzing the accounts engaging with the platform message including the image, topic disambiguation is performed using the obtained information and returns a result of topics {fashion, fashion show}. In this scenario, the validation of the initial classification results in a change to the initial classification, from inappropriate content to an image about fashion, and the image is classified using the key words fashion and fashion show. The image may then be placed in the message search pool under these key words, and/or recommendations based on the classification of the image may be provided.

Example 5

As another example, consider the scenario in which a multi-modal message is selected. In this case, suppose the message includes the text: "At the Victoria's secret fashion show!" and also includes an image of a fashion model modeling lingerie on the runway. In this example, classification of the image may result in an initial classification of "do not post" or "ignore;" however, when the multi-modal message is classified including the text, the message may be classified as {fashion, fashion show}.

Now suppose the message goes viral, and conversation surrounding the message becomes an event on the social network platform. This information may be delayed, and not in real-time, due to the inherent properties of the platform. However, in this case, in one or more embodiments of the invention, the engagement data surrounding the message may also be classified with the same key words/topics {fashion, fashion show}, enabling the social network platform to classify entire conversations with the same searchable key words or topics.

While the above discussion indicates that the social network platform performs the method shown in FIGS. 2-4, one or more steps may be performed by an entity (entities) (e.g., a service) executing external to the social network platform. In such scenarios, the social network platform provides the information that is necessary to perform the one or more steps to the entity and then receives the correspond results from the entity that performed by the one or more steps.

Figure 5:
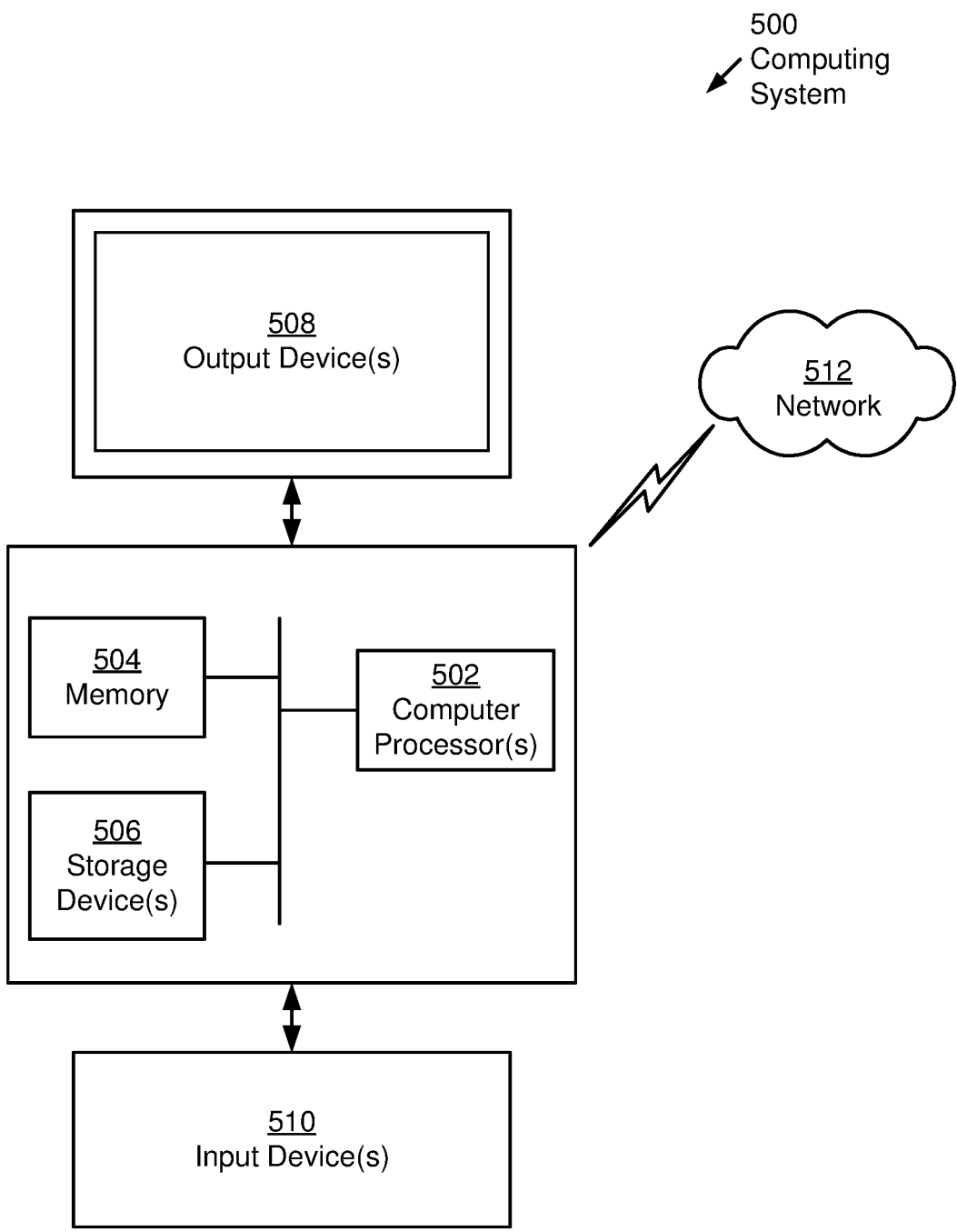
FIG. 5 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing system or devices that includes at least the minimum processing power, memory, and input and output device(s) to perform one or more embodiments of the invention. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and connected to the other elements over a network (512). Further, embodiments of the invention may be implemented on a distributed system having a plurality of nodes, where each portion of the invention may be located on a different node within the distributed system. In one embodiment of the invention, the node corresponds to a distinct computing system. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising one or more computers and one or more storage devices on which are stored instructions that are operable, when executed by the one or more computers, to cause the one or more computers to perform operations comprising:

obtaining, for a message that was broadcasted on a social network platform and is associated with an initial classification that identifies a first set of topics for the message, topic engagement information about third party accounts engaging with the message, the topic engagement information comprising one or more distributions of topic interest scores, topic expertise scores, or both, associated with the third party accounts;

determining that the message is associated with an engagement-based classification using the topic engagement information, wherein the engagement-based classification associates the message with a second set of topics of a plurality of topics that includes the first set of topics;

validating the initial classification for the message by:
 determining whether the engagement-based classification is the same as the initial classification; and
 determining a final classification for the message using a result of the determination whether the engagement-based classification is the same as the initial classification;

generating, using the final classification, a recommendation for one or more other accounts of the social network platform; and broadcasting the recommendation to the one or more other accounts.

2. The system of claim 1, wherein determining the final classification for the message comprises:

determining that the engagement-based classification is the same as the initial classification; and maintaining, as the final classification, the initial classification in response to determining that the engagement-based classification is the same as the initial classification.

3. The system of claim 1, wherein determining the final classification for the message comprises:

determining that the engagement-based classification is different from the initial classification; and switching the initial classification for the message to the engagement-based classification as the final classification, in response to determining that the engagement-based classification is different from the initial classification.

4. The system of claim 1, wherein determining that the message is associated with the engagement-based classification comprises:

generating the engagement-based classification for the message using the topic engagement information, a content-based classification, and author topic scores.

5. The system of claim 1, wherein the operations further comprise:

determining, using the topic engagement information, whether an engagement threshold is satisfied, wherein determining that the message is associated with the engagement-based classification using the topic engagement information is responsive to determining that the engagement threshold is satisfied.

6. The system of claim 1, wherein:
the final classification includes one or more topics from the plurality of topics; and
broadcasting the recommendation to the one or more other accounts comprises:
identifying the one or more other accounts that are associated with the one or more topics included in the final classification, wherein the one or more other accounts are not currently following an account that authored the message; and
broadcasting, to one or more client devices each for one of the one or more other accounts, instructions to cause the one or more client devices to present the message.

7. The system of claim 1, wherein the operations further comprise:
placing the message and data for one or more topics included in the final classification of the message in a message search pool in the social network platform, wherein the message search pool comprises messages broadcasted on the social network platform that are each associated with at least one of the plurality of topics using corresponding final classifications for the messages.

8. The system of claim 7, wherein the operations further comprise:
receiving a search request for messages related to a particular topic; and
responding, using topics for final classifications for one or more messages, to the search request with the one or more messages associated with the particular topic in the message search pool.

9. One or more non-transitory computer storage media encoded with computer program instructions that, when executed by one or more computers, cause the one or more computers to perform operations comprising:
obtaining, for a message that was broadcasted on a social network platform and is associated with an initial classification that identifies a first set of topics for the message, topic engagement information about third party accounts engaging with the message, the topic engagement information comprising one or more distributions of topic interest scores, topic expertise scores, or both, associated with the third party accounts;
determining that the message is associated with an engagement-based classification using the topic engagement information, wherein the engagement-based classification associates the message with a second set of topics of a plurality of topics that includes the first set of topics;
validating the initial classification for the message by:
determining whether the engagement-based classification is the same as the initial classification; and
determining a final classification for the message using a result of the determination whether the engagement-based classification is the same as the initial classification;
generating, using the final classification, a recommendation for one or more other accounts of the social network platform; and
broadcasting the recommendation to the one or more other accounts.

10. The one or more non-transitory computer storage media of claim 9, wherein determining the final classification for the message comprises:

determining that the engagement-based classification is the same as the initial classification; and
maintaining, as the final classification, the initial classification in response to determining that the engagement-based classification is the same as the initial classification.

11. The one or more non-transitory computer storage media of claim 9, wherein determining the final classification for the message comprises:
determining that the engagement-based classification is different from the initial classification; and
switching the initial classification for the message to the engagement-based classification as the final classification, in response to determining that the engagement-based classification is different from the initial classification.

12. The one or more non-transitory computer storage media of claim 9, wherein determining that the message is associated with the engagement-based classification comprises:
generating the engagement-based classification for the message using the topic engagement information, a content-based classification, and author topic scores.

13. The one or more non-transitory computer storage media of claim 9, wherein the operations further comprise:
determining, using the topic engagement information, whether an engagement threshold is satisfied, wherein determining that the message is associated with the engagement-based classification using the topic engagement information is responsive to determining that the engagement threshold is satisfied.

14. The one or more non-transitory computer storage media of claim 9, wherein:
the final classification includes one or more topics from the plurality of topics; and
broadcasting the recommendation to the one or more other accounts comprises:
identifying the one or more other accounts that are associated with the one or more topics included in the final classification, wherein the one or more other accounts are not currently following an account that authored the message; and
broadcasting, to one or more client devices each for one of the one or more other accounts, instructions to cause the one or more client devices to present the message.

15. The one or more non-transitory computer storage media of claim 9, wherein the operations further comprise:
placing the message and data for one or more topics included in the final classification of the message in a message search pool in the social network platform, wherein the message search pool comprises messages broadcasted on the social network platform that are each associated with at least one of the plurality of topics using corresponding final classifications for the messages.

16. The one or more non-transitory computer storage media of claim 15, wherein the operations further comprise:
receiving a search request for messages related to a particular topic; and
responding, using topics for final classifications for one or more messages, to the search request with the one or more messages associated with the particular topic in the message search pool.

17. A computer-implemented method comprising:
obtaining, for a message that was broadcasted on a social network platform and is associated with an initial classification that identifies a first set of topics for the message, topic engagement information about third party accounts engaging with the message, the topic engagement information comprising one or more distributions of topic interest scores, topic expertise scores, or both, associated with the third party accounts;

determining that the message is associated with an engagement-based classification using the topic engagement information, wherein the engagement-based classification associates the message with a second set of topics of a plurality of topics that includes the first set of topics;

validating the initial classification for the message by:
determining whether the engagement-based classification is the same as the initial classification; and
determining a final classification for the message using a result of the determination whether the engagement-based classification is the same as the initial classification;

generating, using the final classification, a recommendation for one or more other accounts of the social network platform; and broadcasting the recommendation to the one or more other accounts.

18. The computer-implemented method of claim 17, wherein determining the final classification for the message comprises:
determining that the engagement-based classification is the same as the initial classification; and
maintaining, as the final classification, the initial classification in response to determining that the engagement-based classification is the same as the initial classification.

19. The computer-implemented method of claim 17, wherein determining the final classification for the message comprises:
determining that the engagement-based classification is different from the initial classification; and
switching the initial classification for the message to the engagement-based classification as the final classification, in response to determining that the engagement-based classification is different from the initial classification.

20. The computer-implemented method of claim 17, wherein determining that the message is associated with the engagement-based classification comprises:
generating the engagement-based classification for the message using the topic engagement information, a content-based classification, and author topic scores.

21. The computer-implemented method of claim 17, further comprising:
determining, using the topic engagement information, whether an engagement threshold is satisfied, wherein determining that the message is associated with the engagement-based classification using the topic engagement information is responsive to determining that the engagement threshold is satisfied.

22. The computer-implemented method of claim 17, wherein:
the final classification includes one or more topics from the plurality of topics; and
broadcasting the recommendation to the one or more other accounts comprises:
identifying the one or more other accounts that are associated with the one or more topics included in the final classification, wherein the one or more other accounts are not currently following an account that authored the message; and
broadcasting, to one or more client devices each for one of the one or more other accounts, instructions to cause the one or more client devices to present the message.

23. The computer-implemented method of claim 17, further comprising:
placing the message and data for one or more topics included in the final classification of the message in a message search pool in the social network platform, wherein the message search pool comprises messages broadcasted on the social network platform that are each associated with at least one of the plurality of topics using corresponding final classifications for the messages.

24. The computer-implemented method of claim 23, further comprising:
receiving a search request for messages related to a particular topic; and
responding, using topics for final classifications for one or more messages, to the search request with the one or more messages associated with the particular topic in the message search pool.

* * * * *